United States Patent
Nagashima et al.

(10) Patent No.: US 8,095,284 B2
(45) Date of Patent: Jan. 10, 2012

(54) AUTOMATIC TRANSMISSION AND CONTROL METHOD THEREOF

(75) Inventors: Fumitaka Nagashima, Fuji (JP); Hajime Tasaka, Fuji (JP); Yoshihide Shinso, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 399 days.

(21) Appl. No.: 12/478,332

(22) Filed: Jun. 4, 2009

(65) Prior Publication Data
US 2009/0306867 A1    Dec. 10, 2009

(30) Foreign Application Priority Data
Jun. 10, 2008  (JP) ................................ 2008-151521

(51) Int. Cl.
*G06F 7/00* (2006.01)
*G06F 17/00* (2006.01)

(52) U.S. Cl. .............. 701/51; 477/61; 477/66; 477/156; 475/61; 475/63; 475/64; 475/31; 475/120; 137/315.03; 701/52; 701/55; 701/56; 701/66

(58) Field of Classification Search .................... 477/61, 477/66, 158, 156; 475/31, 61, 120; 137/315.03; 701/51–52, 55, 56, 66; 74/335
See application file for complete search history.

(56) References Cited

U.S. PATENT DOCUMENTS

| | | | | |
|---|---|---|---|---|
| 3,614,903 A | * | 10/1971 | Masaaki et al. | 477/61 |
| 4,905,530 A | * | 3/1990 | Stehle et al. | 74/335 |
| 4,987,792 A | * | 1/1991 | Mueller et al. | 74/473.12 |
| 5,009,128 A | * | 4/1991 | Seidel et al. | 477/122 |
| 5,044,220 A | * | 9/1991 | Raff et al. | 74/473.18 |
| 5,056,376 A | * | 10/1991 | Moroto et al. | 74/335 |
| 5,062,314 A | * | 11/1991 | Maier et al. | 74/473.18 |
| 5,070,740 A | * | 12/1991 | Giek et al. | 74/473.18 |
| 5,127,288 A | * | 7/1992 | Hojo et al. | 74/335 |
| 5,393,275 A | * | 2/1995 | Okada et al. | 477/81 |
| 2007/0078042 A1 | * | 4/2007 | Yoneyama | 477/125 |
| 2008/0113839 A1 | * | 5/2008 | Nozaki et al. | 475/31 |

FOREIGN PATENT DOCUMENTS

| | | |
|---|---|---|
| EP | 1 770 314 A2 | 4/2007 |
| JP | 62233547 A * | 10/1987 |
| JP | 01-172660 A | 7/1989 |
| JP | 01216166 A * | 8/1989 |

(Continued)

OTHER PUBLICATIONS

The second generation spintronic materials and devices; Yongbing Xu; Vacuum Electron Sources Conference and Nanocarbon (IVESC), 2010 8th International; Digital Object Identifier: 10.1109/VESC.2010.5644342; Publication Year: 2010 , pp. 127-128.*

(Continued)

*Primary Examiner* — Cuong H Nguyen
(74) *Attorney, Agent, or Firm* — Foley & Lardner LLP (57) ABSTRACT

An automatic transmission control unit determines whether or not a constantly open failure, in which a switch valve cannot switch a pressure regulating valve and a second hydraulic chamber to a non-communicative state, has occurred on the basis of a parameter (an inertia phase time, for example) representing a dynamic characteristic during a shift from a first gear position to a second gear position. The determination of the constantly open failure is begun after initial variation in the parameter representing the dynamic characteristic during the shift has been eliminated through learning control in which the dynamic characteristic during the shift is caused to approach a target dynamic characteristic.

18 Claims, 7 Drawing Sheets

FOREIGN PATENT DOCUMENTS

| | | | | |
|---|---|---|---|---|
| JP | 03020162 | A | * | 1/1991 |
| JP | 05240338 | A | * | 9/1993 |
| JP | 05-288264 | A | | 11/1993 |
| JP | 05-296329 | A | | 11/1993 |
| JP | 06-341539 | A | | 12/1994 |
| JP | 08184365 | A | * | 7/1996 |
| JP | 08-210490 | A | | 8/1996 |
| JP | 2005291486 | A | * | 10/2005 |
| JP | 2008039164 | A | * | 2/2008 |
| JP | 201 01 5641 | | * | 7/2010 |

OTHER PUBLICATIONS

Elastohydrodynamic lubrication design of internal gear transmission; Bao Peide; Xie Jun; Yin Xiaoqin; Yang Qizhi; Ma Luzhong; Consumer Electronics, Communications and Networks (CECNet), 2011 International Conference on ; Digital Object Identifier: 10.1109/CECNET.2011.5768745; Publication Year: 2011, pp. 310-313.*

Design and evaluation of a magnetic planetary gearbox for compact harsh environments; Abdel-Khalik, A.S.; Elshebeny, A.S.; Ahmed, S.; Power Electronic Drives Automation and Motion (SPEEDAM), 2010 International Symposium on; Digital Object Identifier: 10.1109/SPEEDAM.2010.5544767; Publication Year: 2010 , pp. 1178-1182.*

Elastohydrodynamic Lubrication research on Planetary Gear Transmission; Bao Peide; Xie Jun; Yin Xiaoqin; Yang Qizhi; Ma Luzhong; New Technology of Agricultural Engineering (ICAE), 2011 International Conference on; Digital Object Identifier: 10.1109/ICAE.2011.5943751; Publication Year: 2011 , pp. 70-73.*

Selection of the Electric Motors for Oil Well Beam Pumping; Poore, J. N.; American Institute of Electrical Engineers, Transactions of the; vol. 70 , Issue: 2; Digital Object Identifier: 10.1109/T-AIEE.1951.5060667; Publication Year: 1951 , pp. 2008-2015.*

* cited by examiner

FIG. 1

|  | B1<br>Fr/B | C1<br>I/C | C2<br>D/C | C3<br>H&LR/C | B2<br>LOW/B | B3<br>2346/B | B4<br>R/B | F1 | F2 |
|---|---|---|---|---|---|---|---|---|---|
| 1st | (○) | | | (○) | ○ | | | ○ | ○ |
| 2nd | | | | (○) | ○ | ○ | | | ○ |
| 3rd | | | ○ | | ○ | ○ | | | |
| 4th | | | ○ | ○ | | ○ | | | |
| 5th | | ○ | ○ | ○ | | | | | |
| 6th | | ○ | | ○ | | ○ | | | |
| 7th | ○ | ○ | | ○ | | | | ○ | |
| Rev. | ○ | | | ○ | | | ○ | | |

AUTOMATIC TRANSMISSION AND CONTROL METHOD THEREOF

TECHNICAL FIELD OF THE INVENTION

This invention relates to fail control executed when a frictional engagement element of an automatic transmission fails.

BACKGROUND OF THE INVENTION

An automatic transmission includes a planetary gear mechanism and a plurality of frictional engagement elements, and switches a gear position by switching an engagement state of each frictional engagement element such that a desired gear position is obtained. In some of the frictional engagement elements, a required engagement capacity differs according to the gear position, but when a working oil pressure supplied to such a frictional engagement element is varied according to the required engagement capacity, hydraulic control becomes complicated.

Hence, in an automatic transmission disclosed in JP5-288264A, two hydraulic chambers to which working oil pressure is supplied are provided individually for a single frictional engagement element, and by supplying oil pressure to one or both of the hydraulic chambers in accordance with the required engagement capacity, the engagement capacity can be varied without increasing the complexity of the hydraulic control.

SUMMARY OF THE INVENTION

In an example of a hydraulic system of a variable capacity frictional engagement element such as that described above, the hydraulic system may be constituted by a pressure regulator valve that regulates the working oil pressure introduced into the frictional engagement element from a source pressure and a switch valve that controls the supply of working oil pressure to one of the two hydraulic chambers.

According to this hydraulic system, three oil pressure supply states can be created by controlling the pressure regulator valve and the switch valve, namely a state in which the pressure regulator valve is set in an oil pressure supply position and the switch valve is set in an open position such that the working oil pressure is supplied to the two hydraulic chambers, a state in which the pressure regulator valve is set in the oil pressure supply position and the switch valve is set in a closed position such that the working oil pressure is supplied to only one of the hydraulic chambers, and a state in which the pressure regulator valve is set in an oil pressure non-supply position such that the working oil pressure is supplied to neither of the hydraulic chambers.

According to this hydraulic system, the supply of working oil pressure to the two hydraulic chambers can be stopped by setting the pressure regulator valve in the oil pressure non-supply position when a burr or the like becomes caught such that the switch valve becomes stuck in the open position (this type of failure will be referred to as a "constantly open failure" hereafter), and therefore, as long as the pressure regulator valve operates normally, the frictional engagement element does not enter a constantly engaged state and does not therefore interfere with the engagement of another frictional engagement element, causing interlocking of the transmission.

However, when the pressure regulator valve becomes stuck in the oil pressure supply position following the occurrence of a constantly open failure in the switch valve, working oil pressure is supplied constantly to the two hydraulic chambers such that the frictional engagement element is constantly engaged. If another frictional engagement element is engaged in this state, interlocking occurs in the transmission. Therefore, fail control, in which, for example, a determination is made as to whether or not a constantly open failure has occurred in the switch valve and when a constantly open failure is determined to have occurred in the switch valve, the gear positions that can be used are restricted, is preferably executed.

An object of this invention is to determine the occurrence of a constantly open failure in a switch valve with a high degree of precision.

According to an aspect of the present invention, an automatic transmission comprising: a planetary gear; a plurality of frictional engagement elements, a plurality of gear positions being realized by switching engagement/disengagement states of the plurality of frictional engagement elements and at least one of the plurality of frictional engagement elements being a variable capacity frictional engagement element that comprises a first hydraulic chamber and a second hydraulic chamber and has an engagement capacity that can be modified by modifying a supply of a working oil pressure to the first hydraulic chamber and the second hydraulic chamber; a pressure regulator valve that regulates the working oil pressure supplied to the variable capacity frictional engagement element from a source pressure; a first oil passage that connects the pressure regulator valve to the first hydraulic chamber; a second oil passage that connects the pressure regulator valve to the second hydraulic chamber; a switch valve provided in the second oil passage to switch a communication state of the second oil passage; a switch valve control unit that uses the switch valve to set the second oil passage in a non-communicative state during a shift from a first gear position in which the variable capacity frictional engagement element is disengaged to a second gear position in which the variable capacity frictional engagement element is engaged, whereby oil pressure is supplied from the pressure regulator valve to the first hydraulic chamber alone; a learning control unit that corrects the working oil pressure such that a dynamic characteristic during a shift approaches a target dynamic characteristic; and a failure determining unit that determines whether or not a constantly open failure, in which the switch valve remains in communication with the second oil passage, has occurred on the basis of a parameter representing the dynamic characteristic during the shift from the first gear position to the second gear position is provided. The failure determining unit begins the constantly open failure determination after the working oil pressure supplied to the variable capacity frictional engagement element has been corrected by the learning control unit.

According to another aspect of the present invention, a control method for an automatic transmission comprising a planetary gear; a plurality of frictional engagement elements, a plurality of gear positions being realized by switching engagement/disengagement states of the plurality of frictional engagement elements and at least one of the plurality of frictional engagement elements being a variable capacity frictional engagement element that comprises a first hydraulic chamber and a second hydraulic chamber and has an engagement capacity that can be modified by modifying a supply of a working oil pressure to the first hydraulic chamber and the second hydraulic chamber; a pressure regulator valve that regulates the working oil pressure supplied to the variable capacity frictional engagement element from a source pressure; a first oil passage that connects the pressure regulator valve to the first hydraulic chamber; a second oil passage that connects the pressure regulator valve to the second hydraulic chamber; and a switch valve provided in the second oil passage to switch a communication state of the second oil passage is provided. The method comprises: a switch valve control step for using the switch valve to set the second oil passage in a non-communicative state during a shift from a first gear position in which the variable capacity frictional engagement element is disengaged to a second gear position in which the variable capacity frictional engagement element is engaged, whereby oil pressure is supplied from the pressure regulator valve to the first hydraulic chamber alone; a learning control step for correcting the working oil pressure such that a dynamic characteristic during a shift approaches a target dynamic characteristic; and a failure determining step for determining whether or not a constantly open failure, in which the switch valve remains in communication with the second oil passage, has occurred on the basis of a parameter representing the dynamic characteristic during the shift from the first gear position to the second gear position. The failure determining step begins the constantly open failure determination after the working oil pressure supplied to the variable capacity frictional engagement element has been corrected by the learning control step.

According to these aspects, the occurrence of a constantly open failure in the switch valve is determined on the basis of the parameter (the shift time, for example) representing the dynamic characteristic during a shift from the first gear position to the second gear position. When a constantly open failure has occurred in the switch valve, the effects thereof are reflected in the parameter representing the dynamic characteristic during the shift, and therefore, by determining the occurrence of a constantly open failure in the switch valve on the basis of the parameter representing the dynamic characteristic during the shift, a constantly open failure can be detected in the switch valve with a high degree of precision.

Further, initial variation exists in the parameter representing the dynamic characteristic during the shift due to individual differences, and when the constantly open failure is determined when this initial variation still exists, a constantly open failure may be determined erroneously in the switch valve even though a constantly open failure has not occurred. According to this invention, the failure determination is performed after learning control is performed to cause the dynamic characteristic during the shift to approach the target dynamic characteristic, and therefore such erroneous determinations can be prevented.

Embodiments and advantages of this invention will be described in detail below with reference to the attached figures.

DESCRIPTION OF THE PREFERRED EMBODIMENTS

An embodiment of this invention will be described below with reference to the attached drawings.

Figure 1:
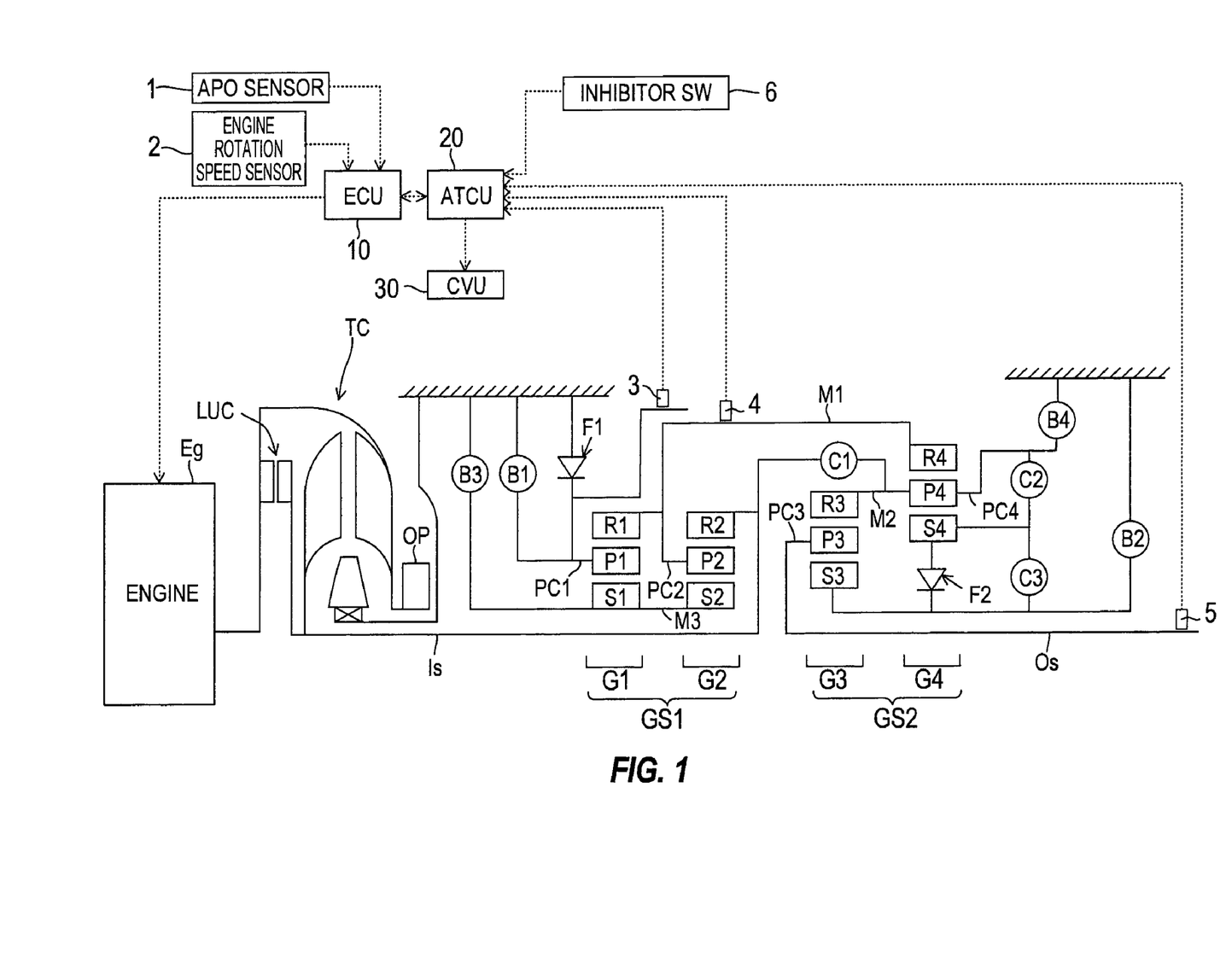
FIG. 1 is a schematic constitutional diagram of a vehicle comprising an automatic transmission according to an embodiment of this invention.

FIG. 1 shows the schematic constitution of a vehicle having an automatic transmission according to an embodiment of this invention. The transmission is a stepped automatic transmission having seven forward speeds and one reverse speed. A rotation of an engine Eg is input into an input shaft Is via a torque converter TC, whereupon a rotation speed thereof is varied by four planetary gears and seven frictional engagement elements and then output from an output shaft Os.

The torque converter TC is a lockup clutch torque converter having a lockup clutch LUC that is capable of disconnecting an impeller side and a turbine side. An oil pump OP is provided coaxially with a pump impeller of the torque converter TC. The oil pump OP is driven to rotate by a driving force of the engine Eg, whereby oil is pressurized and pumped to a desired site of the transmission.

The vehicle is provided with an engine control unit ("ECU" hereafter) 10 that controls a driving state of the engine Eg, an automatic transmission control unit ("ATCU" hereafter) 20 that controls a shift state and so on of the automatic transmission, and a control valve unit ("CVU" hereafter) 30 that controls an oil pressure of each frictional engagement element on the basis of an output signal of the ATCU 20. The ECU 10 and ATCU 20 are connected via a CAN communication line or the like so as to share sensor information and control information through mutual communication.

An APO sensor 1 that detects an accelerator pedal operation of a driver and an engine rotation speed sensor 2 that detects an engine rotation speed are connected to the ECU 10. The ECU 10 controls a fuel injection amount and an intake air amount of the engine on the basis of the engine rotation speed and accelerator pedal operation, whereby the rotation speed and torque of the engine are controlled.

A first turbine rotation speed sensor 3 that detects a rotation speed of a first carrier PC1, a second turbine rotation speed sensor 4 that detects a rotation speed of a first ring gear R1, an output shaft rotation speed sensor 5 that detects a rotation speed of the output shaft Os, and an inhibitor switch 6 that detects a shift lever position are connected to the ATCU 20, and detection signals from these sensors are input into the ATCU 20. A rotation speed of the input shaft Is may be calculated from the rotation speed of the first carrier PC1, the rotation speed of a second carrier PC2, a gear ratio between the first ring gear R1 and a first sun gear S1, and a gear ratio between a second ring gear R2 and a second sun gear S2, or detected directly by attaching a rotation speed sensor to the input shaft Is.

Referring to FIG. 1, a shift gear mechanism of the transmission will now be described.

A first planetary gear set GS1 and a second planetary gear set GS2 are disposed in the transmission in sequence from the input shaft Is side. Further, a plurality of clutches C1, C2, C3 and brakes B1, B2, B3, B4 are provided as the frictional engagement elements. A plurality of one-way clutches F1, F2 are also provided.

A first planetary gear G1 is a single pinion type planetary gear including the first sun gear S1, the first ring gear R1, and the first carrier PC1 supporting a first pinion P1 that meshes with the gears S1, R1. A second planetary gear G2 is a single pinion type planetary gear including the second sun gear S2, the second ring gear R2, and a second carrier PC2 supporting a second pinion P2 that meshes with the gears S2, R2. A third planetary gear G3 is a single pinion type planetary gear including a third sun gear S3, a third ring gear R3, and a third carrier PC3 supporting a third pinion P3 that meshes with the gears S3, R3. A fourth planetary gear G4 is a single pinion type planetary gear including a fourth sun gear S4, a fourth ring gear R4, and a fourth carrier PC4 supporting a fourth pinion P4 that meshes with the gears S4, R4.

The input shaft Is is connected to the second ring gear R2, and a rotation from the engine Eg is input therein via the torque converter TC. The output shaft Os is connected to the third carrier PC3 and transmits an output rotation to a drive wheel via a final gear and so on.

A first connecting member M1 connects the first ring gear R1, the second carrier PC2, and the fourth ring gear R4 integrally. A second connecting member M2 connects the third ring gear R3 and the fourth carrier PC4 integrally. A third connecting member M3 connects the first sun gear S1 and the second sun gear S2 integrally.

The first planetary gear set GS1 connects the first planetary gear G1 to the second planetary gear G2 using the first connecting member M1 and the third connecting member M3, and is constituted by four rotary elements. The second planetary gear set GS2 connects the third planetary gear G3 to the fourth planetary gear G4 using the second connecting member M2, and is constituted by five rotary elements.

In the first planetary gear set GS1, rotation is input into the second ring gear R2 from the input shaft Is, whereupon the input rotation is output to the second planetary gear set GS2 via the first connecting member M1. In the second planetary gear set GS2, rotation is input directly into the second connecting member M2 from the input shaft Is and input into the fourth ring gear R4 via the first connecting member M1, whereupon the input rotation is output to the output shaft Os from the third carrier PC3.

An input clutch C1 selectively disconnects the input shaft Is and the second connecting member M2. A direct clutch C2 selectively disconnects the fourth sun gear S4 and the fourth carrier PC4.

An H&LR clutch C3 selectively disconnects the third sun gear S3 and the fourth sun gear S4. Further, a second one-way clutch F2 is disposed between the third sun gear S3 and fourth sun gear S4. Hence, when the H&LR clutch C3 is disengaged and the rotation speed of the fourth sun gear S4 is higher than that of the third sun gear S3, the third sun gear S3 and fourth sun gear S4 generate independent rotation speeds. Accordingly, the third planetary gear G3 and fourth planetary gear G4 are connected via the second connecting member M2 such that the respective planetary gears attain independent gear ratios.

A front brake B1 selectively stops the rotation of the first carrier PC1. Further, the first one-way clutch F1 is disposed in parallel with the front brake B1. A low brake B2 selectively stops the rotation of the third sun gear S3. A 2346 brake B3 selectively stops the rotation of the third connecting member M3 connecting the first sun gear S1 and the second sun gear S2. A reverse brake B4 selectively stops the rotation of the fourth carrier PC4.

Figure 2:
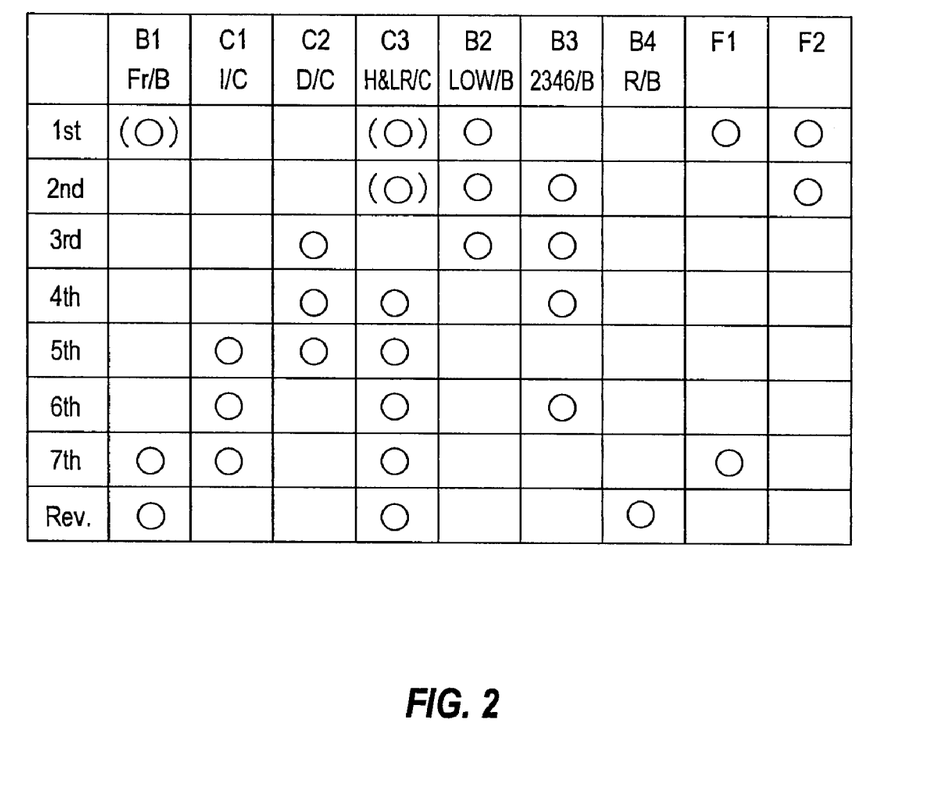
FIG. 2 is an engagement table showing relationships between gear positions and engagement states of respective frictional engagement elements.

FIG. 2 is an engagement table showing engagement states of the respective frictional engagement elements in each gear position.

Circles in the table indicate that the corresponding frictional engagement element is in an engaged state, while circles enclosed in parentheses indicate that the frictional engagement element enters the engaged state when a shift position (range) for activating an engine brake is selected. As shown in the table, a desired gear position can be realized by switching the engagement states of the respective frictional engagement elements.

According to this table, in a first speed, the low brake B2 enters the engaged state such that the first one-way clutch F1 and the second one-way clutch F2 are engaged. In a second speed, the low brake B2 and the 2346 brake B3 enter the engaged state such that the second one-way clutch F2 is engaged. In a third speed, the low brake B2, 2346 brake B3, and direct clutch C2 enter the engaged state such that neither the first one-way clutch F1 nor the second one-way clutch F2 is engaged.

In a fourth speed, the 2346 brake B3, direct clutch C2, and H&LR clutch C3 enter the engaged state. In a fifth speed, the input clutch C1, direct clutch C2, and H&LR clutch C3 enter the engaged state. In a sixth speed, the 2346 brake B3, input clutch C1, and H&LR clutch C3 enter the engaged state. In a seventh speed, the front brake B1, input clutch C1, and H&LR clutch C3 enter the engaged state such that the first one-way clutch F1 is engaged.

In the reverse speed, the reverse brake B4, the front brake B1, and the H&LR clutch C3 enter the engaged state.

Next, the low brake B2 will be described. The low brake B2 is a variable capacity frictional engagement element that is engaged only in the first to third speeds, as shown in FIG. 2, and can be subjected to engagement capacity modification in accordance with the gear position.

Figure 3:
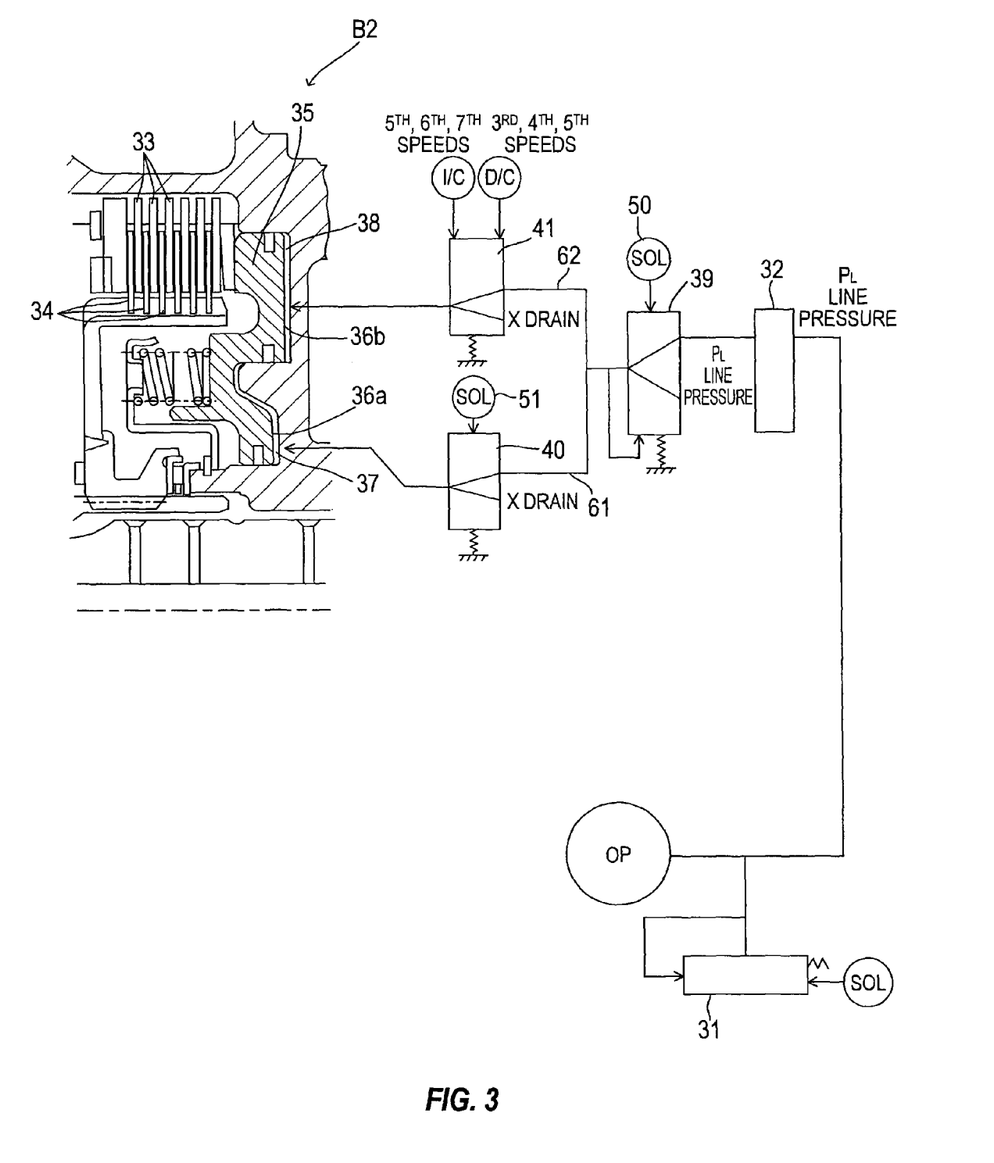
FIG. 3 is a view showing a low brake and a hydraulic circuit thereof.

As shown in FIG. 3, the low brake B2 includes a plurality of first friction plates 33 and second friction plates 34 disposed alternately, and is engaged when the first friction plates 33 are pressed against the second friction plates 34 by a piston 35.

Further, the piston 35 includes a first pressure receiving portion 36a and a second pressure receiving portion 36b having a greater pressure receiving area than the first pressure receiving portion 36a, which are provided independently on a back surface thereof, as well as a first hydraulic chamber 37 and a second hydraulic chamber 38 which apply a working oil pressure to the first pressure receiving portion 36a and second pressure receiving portion 36b, respectively.

With this constitution, the engagement capacity of the low brake B2 can be modified by supplying working oil pressure to both the first hydraulic chamber 37 and the second hydraulic chamber 38 in the first and second speeds, in which a large engagement capacity is required, and supplying working oil pressure only to the first hydraulic chamber 37 in the third speed, in which the required engagement capacity is not as large as that of the first and second speeds.

More specifically, when the working oil pressure is supplied to both the first hydraulic chamber 37 and the second hydraulic chamber 38, the engagement capacity of the low brake B2 takes a value obtained by multiplying the working oil pressure by a sum of the pressure receiving areas of the first pressure receiving portion 36a and second pressure receiving portion 36b, and therefore the engagement capacity of the low brake B2 increases. When the working oil pressure is only supplied to the first hydraulic chamber 37, on the other hand, the engagement capacity of the low brake B2 takes a value obtained by multiplying the working oil pressure by the pressure receiving area of the first pressure receiving portion 36a, and therefore the engagement capacity of the low brake B2 decreases.

To describe a hydraulic circuit of the low brake B2, an output pressure of the oil pump OP is regulated to a line pressure PL in accordance with an opening of a pressure regulator valve 31. The line pressure PL is then supplied to the low brake B2 and the other frictional engagement elements along an oil passage that is switched by a manual valve 32.

The working oil pressure supplied to the low brake B2 is controlled by a pressure regulator valve 39, a first switch valve 40 provided in a first oil passage 61 that connects the pressure regulator valve 39 to the first hydraulic chamber 37, and a second switch valve 41 provided in a second oil passage 62 that connects the pressure regulator valve 39 to the second hydraulic chamber 38.

A valve opening of the pressure regulator valve 39 is controlled in accordance with an operating amount of a linear solenoid 50 such that in an oil pressure supply position, the working oil pressure supplied to the low brake B2 is regulated from the line pressure PL.

The first switch valve 40 can be switched by a signal pressure from an ON/OFF solenoid 51 between an open position, in which it communicates with the first oil passage 61, and a closed position, in which it does not communicate with the first oil passage 61.

The second switch valve 41 can be switched using a pressure supplied to the input clutch C1 and the direct clutch C2 as a signal pressure between an open position, in which it communicates with the second oil passage 62 when no oil pressure is supplied to the input clutch C1 and the direct clutch C2, and a closed position, in which it does not communicate with the second oil passage 62 when oil pressure is supplied to the input clutch C1 or the direct clutch C2.

When both the first switch valve 40 and the second switch valve 41 are in the closed position, the working oil pressure is supplied to neither the first hydraulic chamber 37 nor the second hydraulic chamber 38. When one of the first switch valve 40 and second switch valve 41 is in the open position, the working oil pressure is supplied to the first hydraulic chamber 37 or the second hydraulic chamber 38 via the switch valve that is in the open position. When both the first switch valve 40 and the second switch valve 41 are in the open position, the working oil pressure is supplied to the first hydraulic chamber 37 and the second hydraulic chamber 38.

Next, the content of the control executed by the ATCU 20 will be described.

[Shift Control]

The ATCU 20 selects an optimum command gear position on the basis of a vehicle speed and the accelerator pedal operation by referring to a predetermined shift map, and outputs a control command to the CVU 30 such that the command gear position is achieved.

[Rotation Synchronization Control]

The ATCU 20 performs rotation synchronization control to shorten the shift time and reduce shift shock. According to this rotation synchronization control, during a shift, the frictional engagement elements used to transmit power in the pre-shift gear position are disengaged, whereupon the engine output is controlled such that the engine rotation speed approaches a post-shift engine rotation speed. Thus, the engine rotation speed approaches the post-shift engine rotation speed. When the engine rotation speed is close to the post-shift engine rotation speed, the frictional engagement elements used to transmit power in the post-shift gear position are engaged. This rotation synchronization control is preferably performed during a downshift, but may also be performed during an upshift.

[Learning Control]

The ATCU 20 corrects the working oil pressure such that a dynamic characteristic during a shift corresponds to a target dynamic characteristic. More specifically, the working oil pressure supplied to the frictional engagement elements is corrected on the basis of a deviation between an actual shift time and a target shift time such that a time period (the shift time) extending from issuance of a shift command to completion of the shift corresponds to a desired shift time (the target shift time). This control is performed to correct differences in the shift time caused by variation in an initial working oil pressure corresponding to individual differences.

Figure 4:
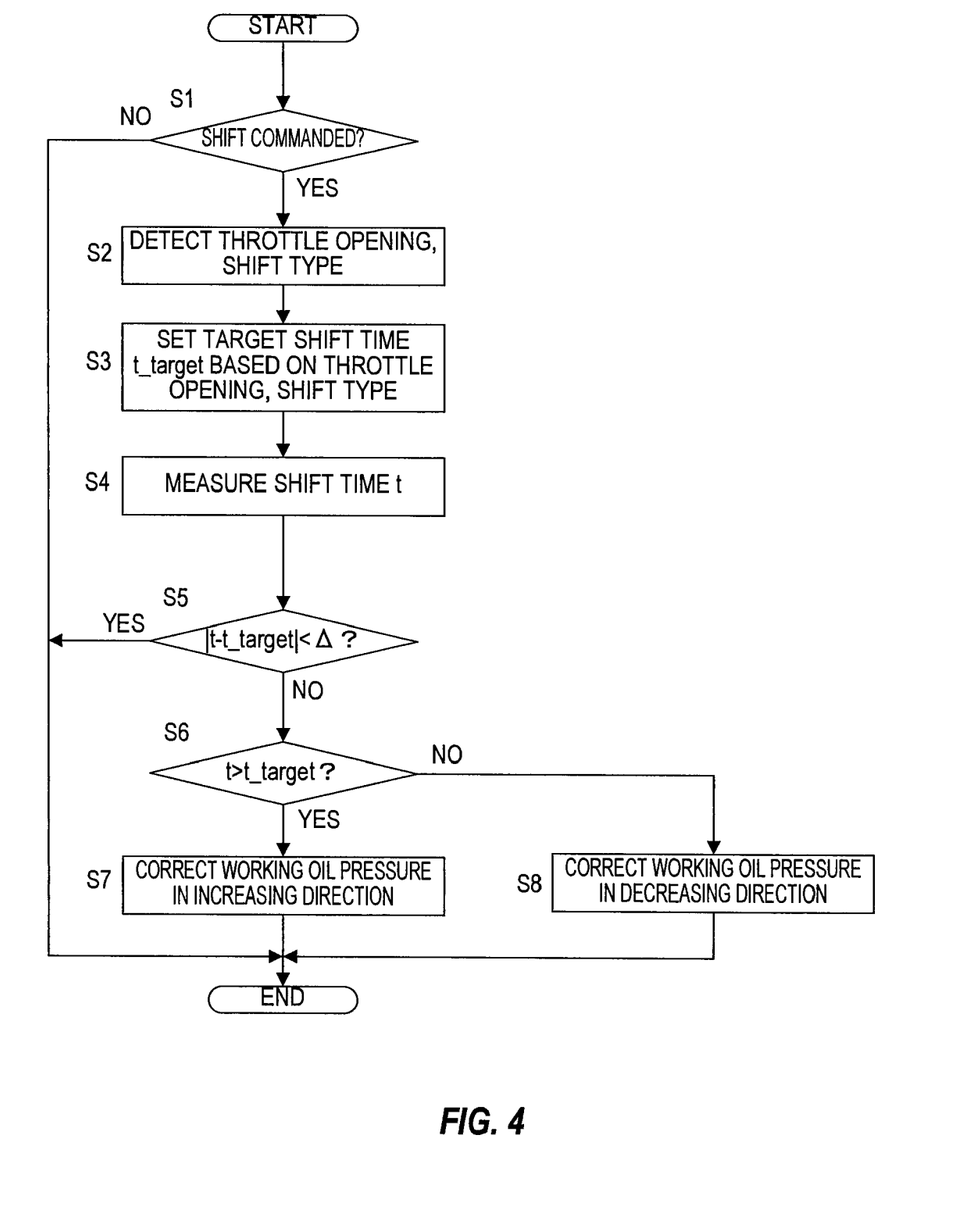
FIG. 4 is a flowchart showing the content of learning control performed by an automatic transmission control unit (ATCU).

FIG. 4 shows the learning control performed by the ATCU 20 in detail.

The content of the learning control will now be described with reference to FIG. 4. First, in a step S1, a determination is made as to whether or not a shift command has been issued. A shift command is determined to have been issued when the command gear position determined by referring to the shift map has varied from a previous value.

When a shift command has been issued, the routine advance to a step S2, in which a throttle opening and a shift type (upshift or downshift) are detected. In a step S3, a target shift time t_target is set on the basis of the throttle opening and the shift type by referring to a predetermined map.

In a step S4, a shift time t is measured. Here, a variation period of an actual gear ratio (=rotation speed of input shaft Is/rotation speed of output shaft Os), or in other words an inertia phase period, is measured as the shift time t. More specifically, a shift is determined to have begun when an absolute value of a deviation between a gear ratio of the pre-shift gear position and the actual gear ratio has become larger than a predetermined value, the shift is determined to be complete when the absolute value of the deviation between the gear ratio of the pre-shift gear position and the actual gear ratio has become smaller than a predetermined value, and the time period between the start of the shift and shift completion is measured. The method of measuring the shift time t is not limited to this method, and the shift time t may be measured on the basis of variation in the rotation speed of the input shaft Is, for example.

In a step S5, a determination is made as to whether or not an absolute value of a deviation between the shift time t and the target shift time t_target is smaller than a predetermined brief time period $\Delta$. When the absolute value of the deviation is smaller than the brief time period $\Delta$, this indicates that the shift time t substantially matches the target time t_target and that there is no need to correct the working oil pressure supplied to the frictional engagement elements. Accordingly, the processing is terminated.

When the absolute value of the deviation is larger than the brief time period $\Delta$, a further determination is made in a step S6 as to whether or not the shift time t is longer than the target shift time t_target. When the shift time t is longer than the target shift time t_target, this indicates that the shift time t is too long, and therefore the routine advances to a step S7, in which the working oil pressure supplied to the frictional engagement elements is corrected in an increasing direction in order to shorten the shift time t of the next shift onward.

When, on the other hand, the shift time t is shorter than the target shift time t_target, this indicates that the shift time t is too short, and therefore the routine advances to a step S8, in which the working oil pressure supplied to the frictional engagement elements is corrected in a decreasing direction in order to lengthen the shift time t of the next shift onward.

By performing this learning control, the working oil pressure supplied to the frictional engagement elements is corrected to cause the shift time t to approach the target shift time t_target, and as a result, initial variation in the shift time t is eliminated.

[Failure Determination Control]

Further, in the automatic transmission constituted as described above, when a burr or the like becomes caught in the second switch valve 41 such that the second switch valve 41 becomes stuck in the open position (to be referred to hereafter as a "constantly open failure") and the pressure regulator valve 39 becomes stuck in the oil pressure supply position thereafter, oil pressure is supplied to the second hydraulic chamber 38 constantly. When a clutch or a brake other than the low brake B2 is engaged at the same time as the low brake B2 during a subsequent shift, interlocking occurs in the transmission, and as a result, driving force can no longer be transmitted.

Hence, the ATCU 20 determines that a constantly open failure has occurred in the second switch valve 41 through the failure determination control to be described below, and having determined that a constantly open failure has occurred, performs predetermined fail control to ensure that interlocking does not occur.

Figure 5:
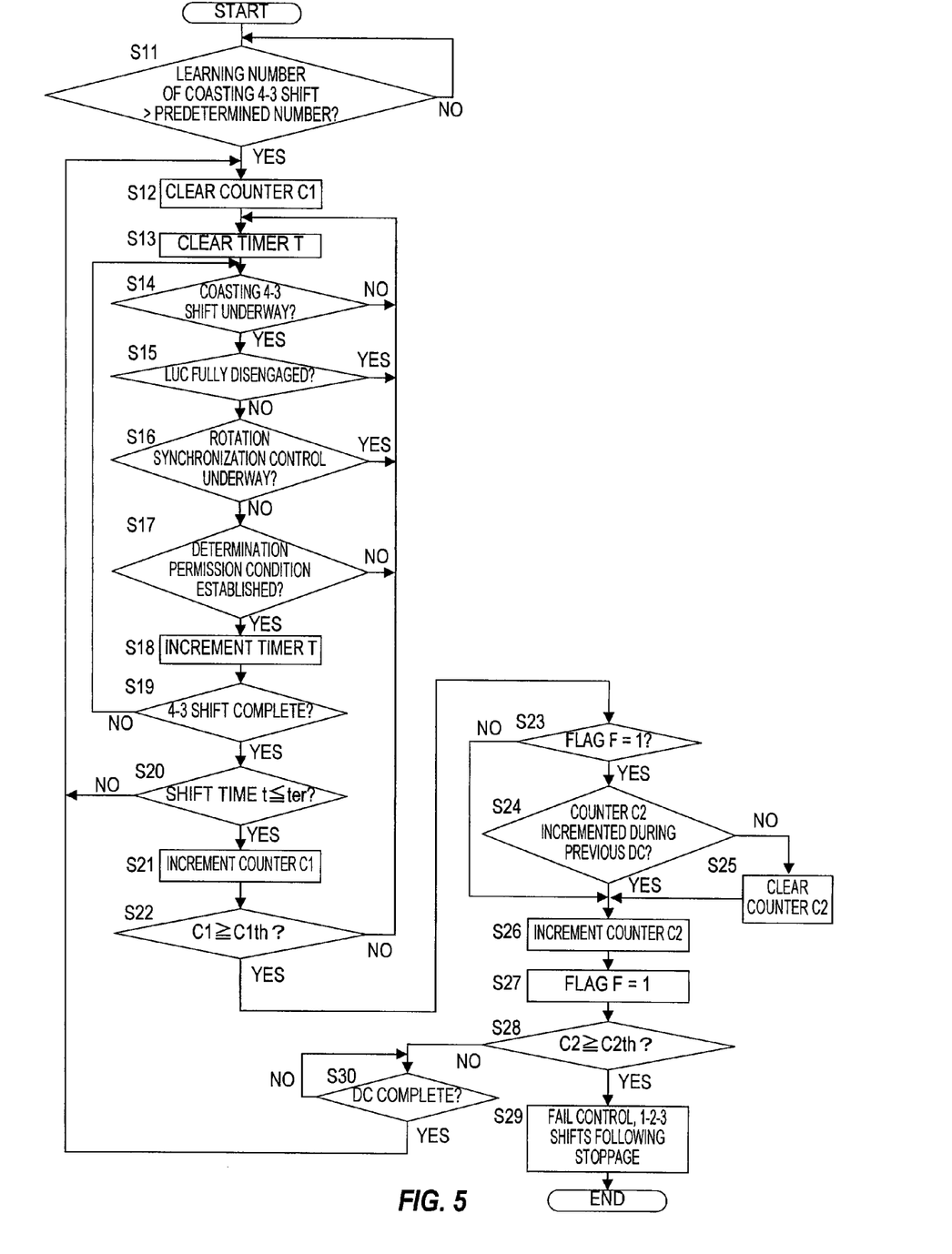
FIG. 5 is a flowchart showing failure determination control performed by the ATCU.

FIG. 5 shows the failure determination control performed by the ATCU 20 in detail. The content of the failure determination control will be described below with reference to FIG. 5.

First, in a step S11, a determination is made as to whether or not a number of executions of the above-described learning control (a learning number) in relation to a coasting 4-3 shift exceeds a predetermined number, and the routine advances to the processing of a step S12 onward, in which a failure determination is executed, only if the learning number exceeds the predetermined number. If the failure determination is performed before learning has progressed, a constantly open failure is erroneously determined to have occurred in the second switch valve 41 in a case where the shift time is short due to initial variation, but by determining that a failure determination starting condition is satisfied when the learning number in relation to a coasting 4-3 shift exceeds the predetermined number, such erroneous determinations can be prevented.

In the step S12, a first counter C1 is cleared. The first counter C1 measures a number of times that the shift time t is determined to be equal to or shorter than a failure determination threshold ter.

In a step S13, a timer T is cleared. The timer T measures an elapsed time following the start of the coasting 4-3 shift.

In a step S14, a determination is made as to whether or not the coasting 4-3 shift is underway. When the coasting 4-3 shift is underway, the routine advances to a step S15, and when the coasting 4-3 shift is not underway, the routine returns to the step S13. A coasting 4-3 shift is determined to be underway when a shift from the fourth speed to the third speed is in progress as the vehicle coasts, i.e. travels with the accelerator pedal OFF. Coasting is detected by determining whether or not an idle switch, not shown in the figures, is ON. Alternatively, coasting may be detected by determining whether or not the accelerator operation is equal to or smaller than a predetermined value on the basis of the APO sensor 1 or determining whether or not the throttle opening is equal to or smaller than a predetermined value, for example.

In the step S15, a determination is made as to whether or not the lockup clutch LUC is fully disengaged. When the lockup clutch LUC is not fully disengaged (when the lockup clutch LUC is engaged or partially engaged), the routine advances to a step S16, and when the lockup clutch LUC is fully disengaged, the routine returns to the step S13. In other words, when the lockup clutch LUC is fully disengaged, the failure determination is not performed in relation to the second switch valve 41.

In the step S16, a determination is made as to whether or not the rotation synchronization control is underway. When the rotation synchronization control is not underway, the routine advances to the step S17, and when the rotation synchronization control is underway, the routine returns to the step S13. In other words, when the rotation synchronization control is underway, the failure determination is not performed in relation to the second switch valve 41.

In the step S17, a determination is made as to whether or not a determination permission condition is established. When the determination permission condition is established, the routine advances to a step S18, and when the condition is not established, the routine returns to the step S13. The determination permission condition is determined to be established when the inhibitor switch 6 is normal, spin has not been detected in the drive wheel, rapid deceleration has not occurred in the vehicle, and a shift position is in a D range.

In the step S18, the timer T is incremented.

In a step S19, a determination is made as to whether or not the 4-3 shift is complete. When it is determined that the 4-3 shift is complete, the value of the timer T at that time is stored as the shift time t, whereupon the routine advances to a step S20. When it is determined that the 4-3 shift is not compete, the routine returns to the step S14. The 4-3 shift is determined to be complete when the inertia phase is complete.

In the step S20, a determination is made as to whether or not the shift time t is equal to or shorter than the failure determination threshold ter. When the shift time t is equal to or shorter than the failure determination threshold ter, the routine advances to a step S21, and when the shift time t is longer than the failure determination threshold ter, the routine returns to the step S12. The failure determination threshold ter is set to be shorter than a minimum obtainable shift time when the second switch valve 41 is operating normally.

In the step S21, the first counter C1 is incremented to count the number of times that the shift time t is determined to be equal to or shorter than the failure determination threshold ter.

In a step S22, a determination is made as to whether or not the first counter C1 equals or exceeds a first threshold C1th. When the first counter C1 equals or exceeds the first threshold C1th, the routine advances to a step S23, and when the first counter C1 does not equal or exceed the first threshold C1th, the routine returns to the step S13.

The first threshold C1th is set at a sufficiently large number so that when a state in which the shift time t of the coasting 4-3 shift is shorter than the failure determination threshold ter occurs continuously within a single drive cycle, it can be said with certainty that a constantly open failure, rather than a temporary malfunction, has occurred in the second switch valve 41. A single drive cycle is a period extending from the point at which an ignition key (or an engine start switch) is operated to an ON position to the point at which the ignition key is returned to an OFF position.

In the step S23, a determination is made as to whether or not a flag F is at 1. When the flag F is at 1, the routine advances to a step S24, and when the flag F is at 0, the routine advances to a step S26. The flag F at 1 indicates that a second counter C2 to be described below has been incremented at least once.

In the step S24, a determination is made as to whether or not the second counter C2 was incremented in a previous drive cycle. When the second counter C2 was incremented in the previous drive cycle, the routine advances to the step S26, and when the second counter C2 was not incremented in the previous drive cycle, the routine advances to a step S25, in which the second counter C2 is cleared. The second counter C2 measures a number of continuous drive cycles during which the first counter C1 reached or exceeded the first threshold C1th.

In the step S26, the second counter C2 is incremented.

In the step S27, the flag F is set at 1.

In a step S28, a determination is made as to whether or not the second counter C2 equals or exceeds a second threshold C2th. When the second counter C2 equals or exceeds the second threshold C2th, the routine advances to a step S29, and when the second counter C2 is lower than the second threshold C2th, the routine advances to a step S30.

In the step S29, the fail control begins. In the fail control, the vehicle performs shifts normally using all of the gear positions until it stops for the first time following the start of the fail control, and then restricts the used gear positions to the first to third speeds during subsequent travel. More specifically, interlocking is prevented by restricting the gear position such that a shift to a gear position in which the low brake B2 must be disengaged to prevent interlocking of the transmission is not performed.

In the step S30, a determination is made as to whether or not the drive cycle is complete. When the drive cycle is complete, the routine returns to the step S12, and when the drive cycle is not complete, the step S30 is executed again. Completion of the drive cycle is determined by determining whether or not the ignition key has been returned to the OFF position.

Hence, according to the failure determination control described above, a failure determination is performed in relation to the second switch valve 41 on the basis of the shift time t, and when a constantly open failure is determined in the second switch valve 41 continuously within a single drive cycle and this state is not eliminated after a plurality of drive cycles, fail control is performed to prohibit the use of gear positions in which the low brake B2 must be disengaged.

Next, actions and effects obtained by performing the above control will be described.

According to the above control, the shift time (inertia phase time) is measured as a parameter representing a dynamic characteristic during a shift from the fourth speed to the third speed, and the determination as to whether or not a constantly open failure has occurred in the second switch valve 41 is made on the basis thereof. When a constantly open failure occurs in the second switch valve 41, the shift time of the 4-3 shift decreases, and therefore, by detecting a constantly open failure in the second switch valve 41 on the basis of the shift time during a 4-3 shift, the constantly open failure can be detected in the second switch valve 41 with a high degree of precision.

Initial variation exists in the shift time due to individual differences, and when the failure determination described above is performed in this state of initial variation, a constantly open failure may be detected erroneously in the second switch valve 41 even when a constantly open failure has not occurred. According to the above control, however, the failure determination is performed after initial variation in the shift time has been eliminated through the learning control, and therefore such erroneous determinations can be prevented.

Figure 6:
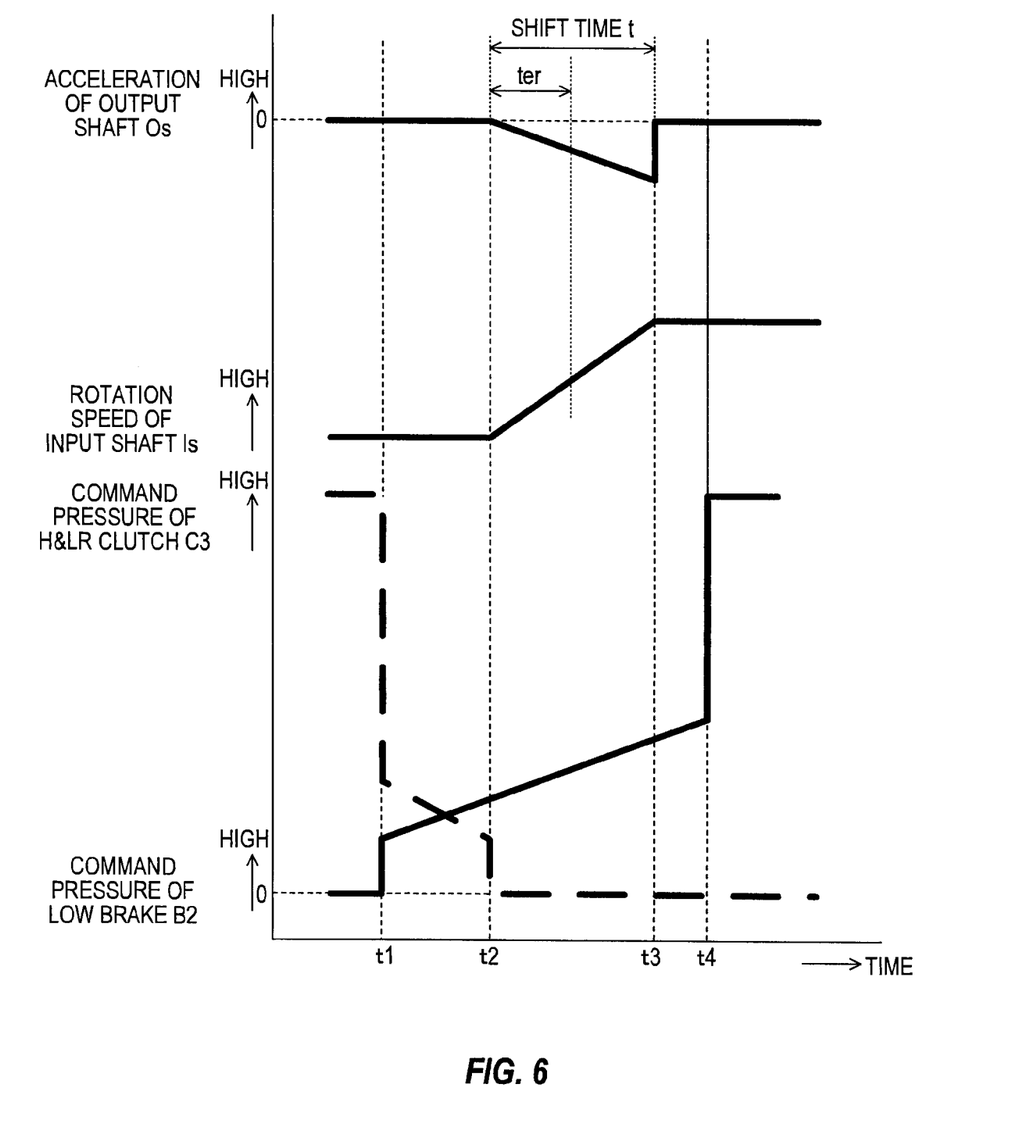
FIG. 6 is a time chart of a normal 4-3 shift.

FIG. 6 is a time chart showing the manner in which a 4-3 shift is performed when the second switch valve 41 operates normally.

When a 4-3 shift command is output at a time t1, the command pressure of the H&LR clutch C3 decreases in step fashion such that the command pressure of the low brake B2 gradually increases. When the H&LR clutch C3 is fully disengaged at a time t2 and the low brake B2 starts to engage, the actual gear ratio varies to a gear ratio corresponding to the third speed, and therefore the rotation speed of the input shaft Is begins to rise and a deceleration of the output shaft Os increases.

When the low brake B2 is fully engaged at a time t3, the deceleration of the output shaft Os is substantially zero and the rotation speed of the input shaft Is is substantially constant. At a time t4, the opening of the pressure regulator valve 39 is set at a maximum opening such that the command pressure of the low brake B2 increases in step fashion.

When the second switch valve 41 operates normally, the shift time t of the 4-3 shift is longer than the failure determination threshold ter, and therefore the second switch valve 41 is determined to be normal.

Figure 7:
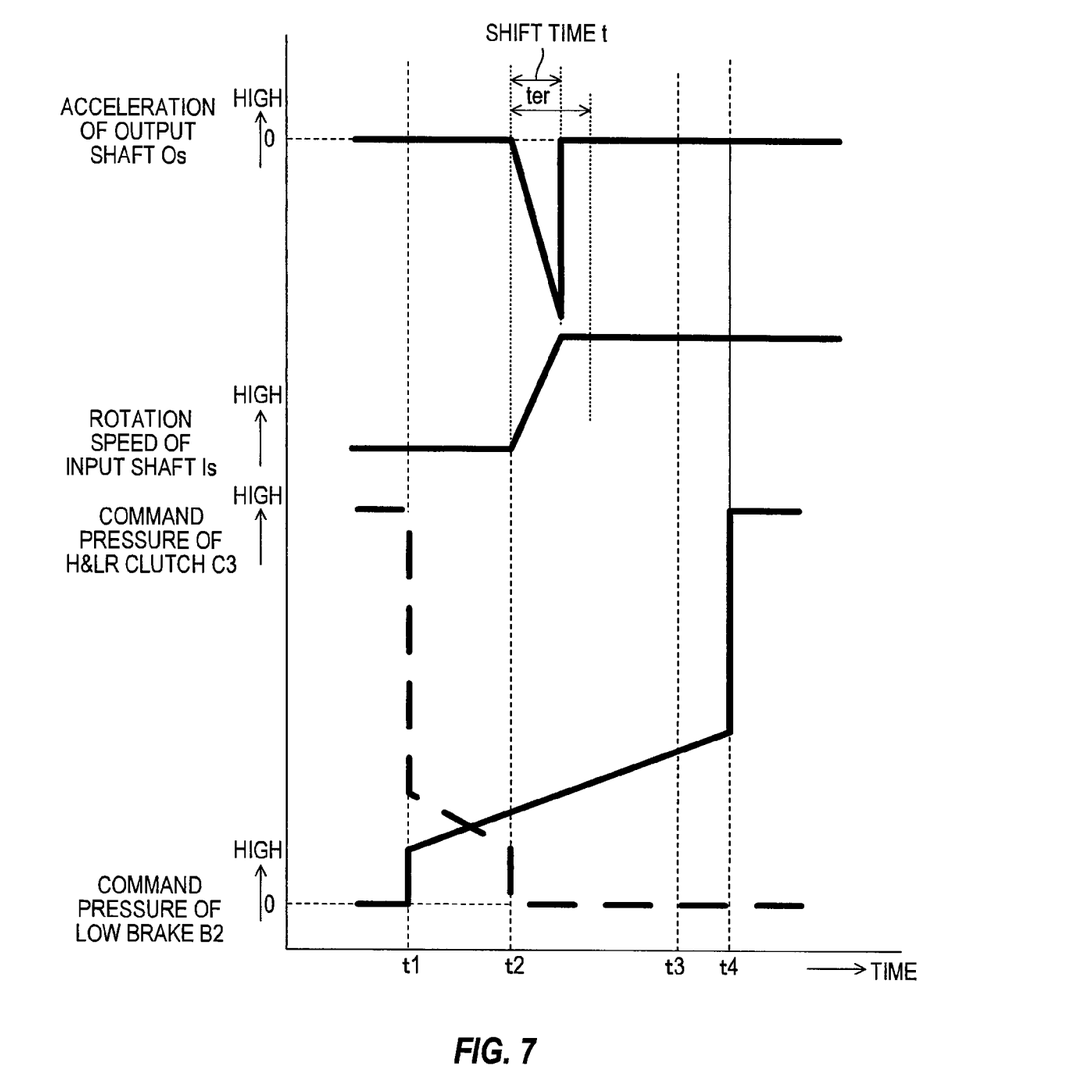
FIG. 7 is a time chart of a 4-3 shift during a failure.

FIG. 7 is a time chart showing the manner in which a 4-3 shift is performed when a constantly open failure has occurred in the second switch valve 41.

When the second switch valve 41 becomes stuck in the open position such that a constantly open failure, in which oil pressure is supplied constantly to the second hydraulic chamber 38, occurs, the oil passage between the pressure regulator valve 39 and the second hydraulic chamber 38 is constantly open, and therefore, even though the command pressure of the low brake B2 during the 4-3 shift remains constant, working oil pressure, which would not normally be supplied to the second hydraulic chamber 38, is supplied to the second hydraulic chamber 38, causing the engagement capacity of the low brake B2 to become excessive. Therefore, when the shift begins at a time t2, the shift progresses rapidly, causing the increase rate of the rotation speed of the input shaft Is and the deceleration of the output shaft Os to increase beyond their normal levels, and as a result, the shift time becomes much shorter than the normal shift time.

Hence, when a constantly open failure occurs in the second switch valve 41, the shift time t of the 4-3 shift is shorter than the failure determination threshold ter, and therefore a constantly open failure is determined to have occurred in the second switch valve 41.

According to the above control, the occurrence of a constantly open failure in the second switch valve 41 can be determined accurately on the basis of the shift time of a 4-3 shift. When it is determined through the above control that a constantly open failure has occurred in the second switch valve 41, the fail control is performed to restrict the use of gear positions in which the low brake B2 must be disengaged to prevent interlocking in the transmission, and therefore, even if the pressure regulator valve 39 fails following the constantly open failure in the second switch valve 41, interlocking does not occur in the transmission.

Further, during a downshift in the coasting state, the turbine rotation speed increases upon engagement of an engagement side frictional engagement element, but when the lockup clutch LUC is fully disengaged, inertia on the transmission input shaft side decreases, making the turbine rotation speed more likely to increase such that the shift time decreases. When the failure determination is performed in this situation, the constantly open failure is highly likely to be detected erroneously in the second switch valve 41.

However, according to the above control, the failure determination is not performed on the second switch valve 41 during a shift performed in a converter state, i.e. when the lockup clutch LUC is disengaged, and therefore a situation in which the shift time decreases as a result of a shift performed in the converter state such that the constantly open failure is determined erroneously in the second switch valve 41 can be prevented.

Similarly, during a shift performed in accordance with the rotation synchronization control, the shift time decreases even though the second switch valve 41 is normal, and therefore, in the above control, the failure determination is not performed on the second switch valve 41 during a shift in which the rotation synchronization control is performed. Therefore, a situation in which the shift time decreases as a result of the rotation synchronization control such that the constantly open failure is determined erroneously in the second switch valve 41 can be prevented.

Furthermore, according to the above control, the fail control is performed when the number of continuous drive cycles in which a constantly open failure is detected continuously in the second switch valve 41 reaches a predetermined number, and therefore the fail control can only be executed when the occurrence of a constantly open failure in the second switch valve 41 has been confirmed. The fail control is not performed during a temporary malfunction, such as when the second switch valve 41 becomes stuck but is released immediately thereafter. As a result, an improvement in the reliability of the control can be achieved and a reduction in drivability occurring when the fail control is executed unnecessarily can be prevented.

Further, in the fail control, shifts are not performed to the fourth to the seventh speeds, i.e. the gear positions in which interlocking occurs when the corresponding frictional engagement elements are set in the engaged state at the same time as the low brake B2 is engaged. As a result, interlocking can be prevented reliably even when the pressure regulator valve 39 fails following a constantly open failure in the second switch valve 41.

An embodiment of this invention was described above, but the technical scope of this invention is not limited to the embodiment described here, and various alterations and modifications may be made within the scope of the technical spirit thereof.

For example, in the embodiment, the shift time is used as a parameter representing the dynamic characteristic during a shift, and the occurrence of a constantly open failure in the second switch valve 41 is determined on the basis thereof. However, determination of a constantly open failure in the second switch valve 41 is not limited to this method, and for example, an acceleration of the output shaft Os, a variation rate of the rotation speed of the input shaft Is, a variation rate of the actual gear ratio, and so on may be used as the parameter representing the dynamic characteristic during the shift such that the occurrence of a constantly open failure in the second switch valve 41 is determined on the basis thereof.

Further, in the embodiment, a target shift time is set for each throttle opening and each shift type during the learning control, and control to correct the working oil pressure is executed on the basis of the deviation between the target shift time and the actual shift time. However, the content of the learning control for eliminating initial variation is not limited thereto, and the learning control for correcting the working oil pressure may be performed on the basis of a comparison of the acceleration of the output shaft Os, the variation rate of the rotation speed of the input shaft Is, a variation rate of the actual gear ratio of the automatic transmission, and so on, for example.

Furthermore, in the learning control and the failure determination control, the inertia phase time is used as the shift time, but a torque phase time or a total time of both phases may be used as the shift time instead. For example, in the learning control, the working oil pressure may be corrected on the basis of a comparison between the torque phase time or the total time of both phases and a target time, and in the failure determination control, the occurrence of a constantly open failure in the second switch valve 41 may be determined on the basis of the torque phase time or the total time of both phases.

Further, the parameter learned in the learning control and the parameter used in the failure determination control may be different. For example, when the torque phase time is learned, initial variation in the working oil pressure may be eliminated by learning the torque phase time, and initial variation in the parameter (the inertia phase time in the above embodiment) representing the dynamic characteristic of the shift, which is used in the failure determination, may also be eliminated. Accordingly, a failure determination based on the inertia phase time may be performed on condition that a torque phase time learning control number exceeds a predetermined number.

Furthermore, in the embodiment, the failure determination is performed on the second switch valve 41 when the learning number of the coasting 4-3 shift equals or exceeds the predetermined number, but it is sufficient for the failure determination to be performed after initial variation in the parameter representing the dynamic characteristic of the shift used in the failure determination has been eliminated, and therefore the determination as to whether or not initial variation in the parameter representing the dynamic characteristic of the shift used in the failure determination has been eliminated by the learning control may be performed on the basis of a number of drive cycles or a traveled distance, for example, and when it is determined that the initial variation has been eliminated, the occurrence of a constantly open failure in the second switch valve 41 may be determined.

This application claims priority based on Japanese Patent Application No. 2008-151521, filed with the Japan Patent Office on Jul. 10, 2008, the entire content of which is incorporated into this specification by reference.

What is claimed is:
1. An automatic transmission comprising:
a planetary gear;
a plurality of frictional engagement elements, a plurality of gear positions being realized by switching engagement/disengagement states of the plurality of frictional engagement elements and at least one of the plurality of frictional engagement elements being a variable capacity frictional engagement element that comprises a first hydraulic chamber and a second hydraulic chamber and has an engagement capacity that can be modified by modifying a supply of a working oil pressure to the first hydraulic chamber and the second hydraulic chamber;
a pressure regulator valve that regulates the working oil pressure supplied to the variable capacity frictional engagement element from a source pressure;
a first oil passage that connects the pressure regulator valve to the first hydraulic chamber;
a second oil passage that connects the pressure regulator valve to the second hydraulic chamber;
a switch valve provided in the second oil passage to switch a communication state of the second oil passage;
a switch valve control unit that uses the switch valve to set the second oil passage in a non-communicative state during a shift from a first gear position in which the variable capacity frictional engagement element is disengaged to a second gear position in which the variable capacity frictional engagement element is engaged, whereby oil pressure is supplied from the pressure regulator valve to the first hydraulic chamber alone;
a learning control unit that corrects the working oil pressure such that a dynamic characteristic during a shift approaches a target dynamic characteristic; and
a failure determining unit that determines whether or not a constantly open failure, in which the switch valve remains in communication with the second oil passage, has occurred on the basis of a parameter representing the dynamic characteristic during the shift from the first gear position to the second gear position, wherein the failure determining unit begins the constantly open failure determination after the working oil pressure supplied to the variable capacity frictional engagement element has been corrected by the learning control unit.

2. The automatic transmission as defined in claim 1, further comprising a torque converter including a lockup clutch,
wherein the failure determining unit does not determine the occurrence of the constantly open failure when the lockup clutch is disengaged.

3. The automatic transmission as defined in claim 1, further comprising a rotation synchronization control unit which, during a shift, disengages a frictional engagement element that transmits power in a pre-shift gear position, controls an engine output such that an engine rotation speed approaches a post-shift engine rotation speed, and engages a frictional engagement element that transmits power in a post-shift gear position once the engine rotation speed has approached the post-shift engine rotation speed,
wherein the failure determining unit does not determine the occurrence of the constantly open failure when the engine rotation speed control performed by the rotation synchronization control unit is underway.

4. The automatic transmission as defined in claim 1, wherein the failure determining unit determines the occurrence of the constantly open failure on the basis of a parameter representing the dynamic characteristic during a shift from the first gear position to the second gear position performed in a coasting state.

5. The automatic transmission as defined in claim 1, further comprising a fail control unit that restricts shifts to a part of the gear positions when a drive cycle in which the failure determining unit determines continuously that the constantly open failure has occurred in the switch valve occurs a plurality of times in succession.

6. The automatic transmission as defined in claim 5, wherein the part of the gear positions corresponds to gear positions in which a frictional engagement element that causes interlocking when engaged at the same time as the variable capacity frictional engagement element is engaged.

7. A control method for an automatic transmission comprising a planetary gear; a plurality of frictional engagement elements, a plurality of gear positions being realized by switching engagement/disengagement states of the plurality of frictional engagement elements and at least one of the plurality of frictional engagement elements being a variable capacity frictional engagement element that comprises a first hydraulic chamber and a second hydraulic chamber and has an engagement capacity that can be modified by modifying a supply of a working oil pressure to the first hydraulic chamber and the second hydraulic chamber; a pressure regulator valve that regulates the working oil pressure supplied to the variable capacity frictional engagement element from a source pressure; a first oil passage that connects the pressure regulator valve to the first hydraulic chamber; a second oil passage that connects the pressure regulator valve to the second hydraulic chamber; and a switch valve provided in the second oil passage to switch a communication state of the second oil passage; the method comprising:
a switch valve control step for using the switch valve to set the second oil passage in a non-communicative state during a shift from a first gear position in which the variable capacity frictional engagement element is disengaged to a second gear position in which the variable capacity frictional engagement element is engaged, whereby oil pressure is supplied from the pressure regulator valve to the first hydraulic chamber alone;
a learning control step for correcting the working oil pressure such that a dynamic characteristic during a shift approaches a target dynamic characteristic; and
a failure determining step for determining whether or not a constantly open failure, in which the switch valve remains in communication with the second oil passage, has occurred on the basis of a parameter representing the dynamic characteristic during the shift from the first gear position to the second gear position,
wherein the failure determining step begins the constantly open failure determination after the working oil pressure supplied to the variable capacity frictional engagement element has been corrected by the learning control step.

8. The control method as defined in claim 7, the transmission further comprising a torque converter including a lockup clutch,
wherein the failure determining step does not determine the occurrence of the constantly open failure when the lockup clutch is disengaged.

9. The control method as defined in claim 7, further comprising a rotation synchronization control step which, during a shift, disengages a frictional engagement element that transmits power in a pre-shift gear position, controls an engine output such that an engine rotation speed approaches a post-shift engine rotation speed, and engages a frictional engagement element that transmits power in a post-shift gear position once the engine rotation speed has approached the post-shift engine rotation speed,
wherein the failure determining step does not determine the occurrence of the constantly open failure when the engine rotation speed control performed by the rotation synchronization control step is underway.

10. The control method as defined in claim 7, wherein the failure determining step determines the occurrence of the constantly open failure on the basis of a parameter representing the dynamic characteristic during a shift from the first gear position to the second gear position performed in a coasting state.

11. The control method as defined in claim 7, further comprising a fail control step for restricting shifts to a part of the gear positions when a drive cycle in which the failure determining step determines continuously that the constantly open failure has occurred in the switch valve occurs a plurality of times in succession.

12. The control method as defined in claim 11, wherein the part of the gear positions corresponds to gear positions in which a frictional engagement element that causes interlocking when engaged at the same time as the variable capacity frictional engagement element is engaged.

13. An automatic transmission comprising:
a planetary gear;
a plurality of frictional engagement elements, a plurality of gear positions being realized by switching engagement/disengagement states of the plurality of frictional engagement elements and at least one of the plurality of frictional engagement elements being a variable capacity frictional engagement element that comprises a first hydraulic chamber and a second hydraulic chamber and has an engagement capacity that can be modified by modifying a supply of a working oil pressure to the first hydraulic chamber and the second hydraulic chamber;
a pressure regulator valve that regulates the working oil pressure supplied to the variable capacity frictional engagement element from a source pressure;
a first oil passage that connects the pressure regulator valve to the first hydraulic chamber;

a second oil passage that connects the pressure regulator valve to the second hydraulic chamber;

a switch valve provided in the second oil passage to switch a communication state of the second oil passage;

switch valve control means for using the switch valve to set the second oil passage in a non-communicative state during a shift from a first gear position in which the variable capacity frictional engagement element is disengaged to a second gear position in which the variable capacity frictional engagement element is engaged, whereby oil pressure is supplied from the pressure regulator valve to the first hydraulic chamber alone;

learning control means for correcting the working oil pressure such that a dynamic characteristic during a shift approaches a target dynamic characteristic; and failure determining means for determining whether or not a constantly open failure, in which the switch valve remains in communication with the second oil passage, has occurred on the basis of a parameter representing the dynamic characteristic during the shift from the first gear position to the second gear position, wherein the failure determining means begins the constantly open failure determination after the working oil pressure supplied to the variable capacity frictional engagement element has been corrected by the learning control means.

14. The automatic transmission as defined in claim 13, further comprising a torque converter including a lockup clutch, wherein the failure determining means does not determine the occurrence of the constantly open failure when the lockup clutch is disengaged.

15. The automatic transmission as defined in claim 13, further comprising rotation synchronization control means which, during a shift, disengages a frictional engagement element that transmits power in a pre-shift gear position, controls an engine output such that an engine rotation speed approaches a post-shift engine rotation speed, and engages a frictional engagement element that transmits power in a post-shift gear position once the engine rotation speed has approached the post-shift engine rotation speed, wherein the failure determining means does not determine the occurrence of the constantly open failure when the engine rotation speed control performed by the rotation synchronization control means is underway.

16. The automatic transmission as defined in claim 13, wherein the failure determining means determines the occurrence of the constantly open failure on the basis of a parameter representing the dynamic characteristic during a shift from the first gear position to the second gear position performed in a coasting state.

17. The automatic transmission as defined in claim 13, further comprising fail control means for restricting shifts to a part of the gear positions when a drive cycle in which the failure determining means determines continuously that the constantly open failure has occurred in the switch valve occurs a plurality of times in succession.

18. The automatic transmission as defined in claim 17, wherein the part of the gear positions corresponds to gear positions in which a frictional engagement element that causes interlocking when engaged at the same time as the variable capacity frictional engagement element is engaged.

* * * * *